(12) United States Patent (10) Patent No.: US 11,856,647 B2
Kurtz (45) Date of Patent: Dec. 26, 2023

(54) METHOD FOR MANAGING PARTLY AND/OR INCOMPLETELY LOADED SUBSCRIPTION DATA

(71) Applicant: GIESECKE+DEVRIENT MOBILE SECURITY GMBH, Munich (DE)

(72) Inventor: Volker Kurtz, Murnau d. Staffelsee (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 247 days.

(21) Appl. No.: 16/098,956

(22) PCT Filed: May 2, 2017

(86) PCT No.: PCT/EP2017/000540
§ 371 (c)(1),
(2) Date: Nov. 5, 2018

(87) PCT Pub. No.: WO2017/190832
PCT Pub. Date: Nov. 9, 2017

(65) Prior Publication Data
US 2019/0200211 A1 Jun. 27, 2019

(30) Foreign Application Priority Data
May 3, 2016 (DE) .......................... 102016005492.1

(51) Int. Cl.
*H04W 8/18* (2009.01)
*H04W 4/70* (2018.01)
*H04W 4/80* (2018.01)
*H04W 80/06* (2009.01)

(52) U.S. Cl.
CPC .............. *H04W 8/183* (2013.01); *H04W 4/70* (2018.02); *H04W 4/80* (2018.02); *H04W 80/06* (2013.01)

(58) Field of Classification Search
CPC ......... H04W 8/183; H04W 4/70; H04W 4/80; H04W 80/06; H04W 88/06; H04L 67/06;
(Continued)

(56) References Cited

U.S. PATENT DOCUMENTS

| | | | |
|---|---|---|---|
| 2005/0021592 A1* | 1/2005 | Patel .................... | H04Q 3/0054 709/200 |
| 2006/0133317 A1* | 6/2006 | Hurtta .................... | H04W 8/20 455/432.3 |

(Continued)

FOREIGN PATENT DOCUMENTS

| | | | | |
|---|---|---|---|---|
| EP | 2086167 A1 | | 8/2009 | |
| EP | 2747466 A1 | * | 6/2014 | ........... H04B 1/3816 |

(Continued)

OTHER PUBLICATIONS

German Search Report from DE Application No. 102016005492.1, dated Oct. 6, 2016.

(Continued)

*Primary Examiner* — Hardikkumar D Patel
(74) *Attorney, Agent, or Firm* — WORKMAN NYDEGGER

(57) ABSTRACT

A method for managing partly and/or incompletely loaded subscription data is provided for a mobile device and/or another device. A communication connection is established between the mobile device and the other device. Then, it is ascertained whether the partly and/or incompletely loaded subscription data is available on the other device, and a managing action is carried out on the partly and/or incompletely loaded subscription data.

11 Claims, 1 Drawing Sheet

(58) Field of Classification Search
CPC . H04L 67/10; G06F 3/04842; G06F 16/1734; G06F 1/163; G06F 1/1643; H04M 1/0279; H04M 1/72412; H04M 2250/02; H04M 2250/12; G04G 21/04; G04G 21/06; H04B 1/38; H04B 2001/3861; Y02D 30/70
See application file for complete search history.

(56) References Cited

U.S. PATENT DOCUMENTS

| | | | |
|---|---|---|---|
| 2014/0045463 A1* | 2/2014 | Hsieh | G04G 21/04 455/414.1 |
| 2016/0007190 A1 | 1/2016 | Wane | |

FOREIGN PATENT DOCUMENTS

| | | |
|---|---|---|
| EP | 2747466 A1 | 6/2014 |
| WO | 2005079103 A1 | 8/2005 |

OTHER PUBLICATIONS

International Search Report from PCT Application No. PCT/EP2017/000540, dated Jun. 14, 2017.
"3rd Generation Partnership Project; Technical Specification Group Core Network and Terminals; Subscriber Data Management: Stage 2 (Release 13)," 3GPP TS 23.016, vol. 13.0.0, Dec. 2015, 32 Pages.
"SGP.22 Remote Provisioning Architecture for Embedded UICC Technical Specification for Consumer Devices," GSMA, Version 0.2.21, Dec. 18, 2015, 118 Pages.

* cited by examiner

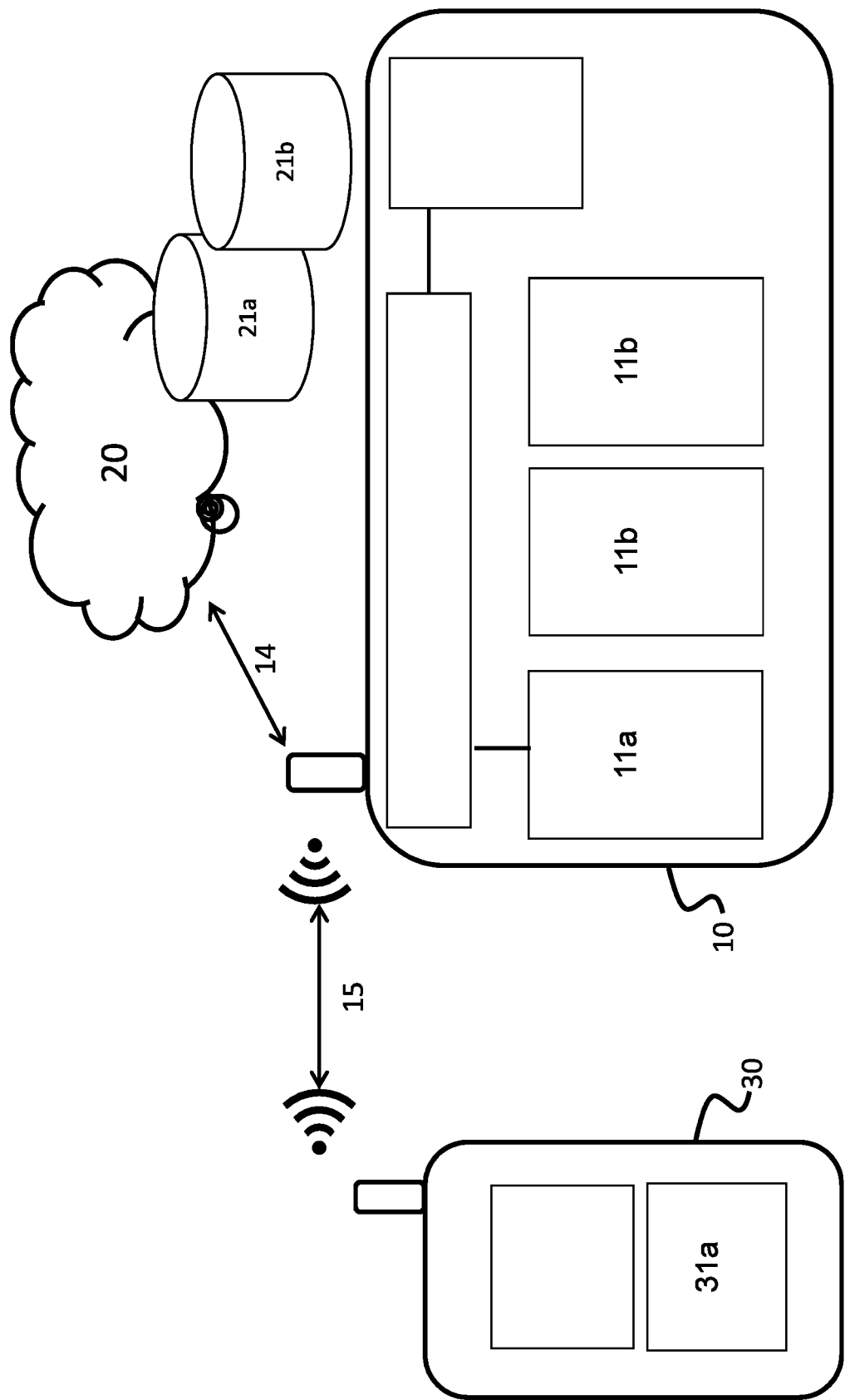

METHOD FOR MANAGING PARTLY AND/OR INCOMPLETELY LOADED SUBSCRIPTION DATA

TECHNICAL FIELD

The present invention relates to a method for managing partially and/or incompletely loaded subscription data. Subscription data are necessary to obtain access to a mobile communication network of an MNO (mobile network operator) with a mobile device, such as for example a mobile telephone. Subscription data can usually be found on a SIM card, which is inserted into a mobile telephone. Alternatively, subscription data can be integrated in a secure element permanently integrated in the mobile device (eUICC) or they can be stored in a secure part of the processor of the mobile device (eUICC).

PRIOR ART

In the prior art, it is known to transmit subscriptions or subscription data via a communication connection, for example via the mobile communication network or a wireless connection, in particular a WLAN connection. Since it is possible to store a multiplicity of subscriptions, which are updated from time to time OTA (over the air), on a SIM/UICC, it must be possible for the owner of a mobile device to delete individual subscriptions.

From WO 2005/079103 A1 a method is known with which it is possible to activate, to delete, to change, etc., connection profiles with a connection manager, which is supplied on the mobile telephone as an application. However, a condition is that that the profiles to be handled are located on the mobile device in a fully loaded state.

As part of the OTA management of profiles, it can occur, however, that a subscription or subscription data are not transmitted to the mobile device in their entirety. The reasons for this can be manifold, for example, the data transmission can be interrupted prior to full completion or it can occur that only a partial aspect of a subscription is changed and it is not required to load the entire subscription again.

According to the specification GSMA SGP22 of December 2015, there is no possibility for the user to identify whether a partial profile is available for download at a remotely disposed server. However, when the mobile telephone is sold, a user wants to make sure that all data are deleted from the mobile telephone.

Further, for a user who wants to manage a subscription of a wearable device coupled with the mobile device there no possibility to identify whether a partially loaded subscription is already located on the wearable device. When the mobile device or the wearable device is resold, this is disadvantageous, since the previous owner, on the one hand, wants to ensure that he sells a device that is free of installed and yet to be installed subscriptions, and the subsequent owner, on the other hand, when switching on the acquired device usually is not interested in getting a subscription installed on the device first, which subscription is of no use to him or is not personalized for him.

STATEMENT OF THE INVENTION

The object of the invention is to make available a method for managing partially and/or incompletely loaded subscription data supplied for a mobile and/or a further device that solves the known problems of the prior art and is further suitable to permit improved control of subscription data to a user.

The object is achieved by the subject matter of patent claim 1. Preferred embodiments of the method according to the invention result from the dependent claims.

The achievement of the object is based on the idea that a solution is made available for determining whether partially and/or incompletely loaded subscription data are present.

Accordingly, the method for managing partially and/or incompletely loaded subscription data, which are supplied for a mobile and/or a further (mobile) device, comprises setting up a communication connection to a further device, ascertaining whether partially and/or incompletely loaded subscription data are available on the further device, and for carrying out a management action on the partially and/or incompletely loaded subscription data.

With the method according to the invention it is possible to ascertain particularly advantageously whether the partially and/or incompletely loaded subscription data are available on the further device. Thus it can be ensured with advantage that no partial subscription data are supplied inadvertently in a further device and, for example, when the mobile device is switched on, are transmitted by the further device to the mobile device and installed there. This is advantageous in particular when the mobile device changes hands in the course of a sale and the hitherto owner wishes to ensure that his subscription data (partial subscription data) do not do not enter into the custody of the buyer when the sold mobile device is reused.

According to an embodiment of the method according to the invention, the communication connection can be a communication protocol in accordance with the TCP/IP standard or an NFC, Bluetooth, WLAN connection. With these connections, a secure, fast and reliable data transmission can be ensured.

According to a further particularly preferred embodiment, the further device is a server, in particular a subscription management server, a content server, an LPA host (load provisioning agent), a discovery server, and a further mobile device connected with the mobile device. These further devices are examples of the further device on which, for example, the partially and/or incompletely loaded subscription data can be supplied. With the method according to the invention it can be ensured with advantage that no partial subscription data are present wrongfully on these further devices. In particular, the partial subscription data on the further device can be deleted.

According to a further particularly preferred embodiment, the further device is a wearable device. By ascertaining whether the partially and/or incompletely loaded subscription data are available on the wearable device and by subsequently carrying out the management action it can be ensured that on a wearable device, which is adapted to execute a subscription, only those subscription data are available which are to be available according to the intention of the owner. This is particularly advantageous when the wearable device changes hands; for example, in the course of a sale.

According to one embodiment, the mobile device is preferably a mobile telephone with a removable (SIM) or inbuilt (eUICC) or integrated (iUICC) secure element, an M2M module, a vehicle with a telematics module and/or a tablet PC. With the method according to the invention it can be ensured with advantage that neither fully loaded subscription data are located on these mobile devices, nor the partially and/or incompletely loaded subscription data are supplied on the further device with which the mobile device is in a communication connection.

The steps according to the method can be executed with an application, wherein the application can be executed on the mobile device and/or the above-mentioned secure element of the mobile device.

According to a further particularly preferred embodiment, the management action comprises the deletion the partially and/or incompletely loaded subscription data. In this manner, a simple and secure handling is permitted of the sensitive subscription data that are not located directly on the mobile device.

According to a further particularly preferred embodiment, the management action comprises a check and/or a change of the data, in particular of the settings, of the partially and/or incompletely loaded subscription data. Thereby, the user can advantageously adapt the data supplied on the further device data to his wishes or requirements before the data are transmitted, for example, to the mobile device.

BRIEF DESCRIPTION OF THE DRAWING

FIG. 1 shows an arrangement that is suitable for use in a method according to the invention, wherein the arrangement comprises a mobile device and a further device.

DETAILED DESCRIPTION OF PREFERRED EMBODIMENTS OF THE INVENTION

In the following the invention is described with reference to exemplary embodiments of the invention.

FIG. 1 shows an arrangement of a mobile device 10 as well as two further devices 20, 30.

The mobile device 10 is a mobile telephone, an M2M module, a vehicle with a telematics module and/or a tablet PC. The mobile device 10 is supplied with a secure element, which is provided in the mobile device in removable manner in the form of a SIM card, in inbuilt manner in the form of an embedded UICC, and/or in integrated manner in the form of an iUICC. Via a subscription loaded into the secure element and/or into one of the profile containers 11a to 11c, the mobile device can establish a communication connection 14 to a mobile communication network 20.

A subscription lays down rules with which the mobile device can communicate with the mobile network 20, for example, which calls are carried out (whether calls to foreign countries are allowed or not) and with which type of connection (2G, 3G, 4G, 5G, etc.) a data connection can be established to the mobile network 20.

The subscriptions in the profile containers 11a to 11c are usually updated from time to time. In the course of this, changes of the properties of the subscription are made, for example the updating of the list of preferred roaming networks. Depending on the scope of the update, it can occur that it is not necessary to fully load the new profile, but that it is sufficient to load only parts of a profile. Further, it can occur that the loading of a profile is interrupted and, as a result, only parts of the profile are present on the mobile device 10. Upon a following attempt at loading subscription data to the mobile device 20, these profiles are loaded via the mobile network 20 by means of the communication connection and can, for example, be supplied on a subscription management server in profile containers 21a, 21b (also referred to as subscription profile containers). In this manner it is ensured that upon the establishment of the communication connection the rest of the subscription data of the partially and/or incompletely loaded subscription profile are transmitted to the mobile device 10 or the secure element of the mobile device 10 in order to be installed subsequently in the associated subscription profile containers 11a to 11c.

According to the specification GSM SGP22 of December 2015, a user of the mobile device can determine whether a full subscription is transmitted to his mobile device 10, but there is no possibility for the user to influence the decision whether any outstanding partially and/or incompletely loaded subscription data are to be transmitted to his mobile device 10. With the method according to the invention a technical possibility is created for the user to ascertain whether subscription data are supplied for him or for his mobile device and/or a further device 30 (wearable device).

For this purpose, a communication connection 14 is established first between the mobile device 10 and the further device, in particular the mobile network 20. The connection 14 is preferably established using a mobile communication network. Subsequently, it is ascertained whether the partially and/or incompletely loaded subscription data are available on the further device 20. In other words, it is ascertained whether partially and/or incompletely loaded subscription data are supplied in the profile containers 21a, 21b of the further device 20. For this purpose a simple request can be made to the profile containers 21a, 21b. Alternatively, the request can be made at regular intervals. In the event that it is ascertained that partially and/or incompletely loaded subscription data for the mobile device 10 are supplied on a profile container 21a, 21b, the owner of the mobile device 10 can be permitted to carry out a management action on the partially and/or incompletely loaded subscription data in the profile containers 21a, 21b. This management action can be, for example, the deletion of the partially and/or incompletely loaded subscription data. Alternatively, the management action can be merely a check and/or change of the partially and/or incompletely loaded subscription data. For the owner, in particular the new owner (after a resale) of the mobile device 10 it s possible to recognize whether data are supplied in the profile containers 21a, 21b. It goes without mention that the mobile device can be a mobile telephone, an M2M module, a vehicle with a telematics module, a tablet PC, etc.

According to an alternative, the communication connection 15 can be set up between the mobile device and a further device, in particular a wearable device 30. Subsequently, it can be ascertained whether partially and/or incompletely loaded subscription data are located on the wearable device 30. These subscription data could be located for example in a profile container 31a on the wearable device. If it is ascertained that this is the case, then a management action, as already explained above, can be carried out in the partially and/or incompletely loaded subscription data in the profile container 31a. Thus, it is possible, in particular when the wearable device 30 is resold, to ensure that no partially and/or incompletely loaded subscription data are located on the are wearable device.

The invention claimed is:

1. A method for managing partially and/or incompletely loaded subscription data, which are supplied for a mobile device, characterized by
setting up a communication connection to a further device,
ascertaining whether the partially and/or incompletely loaded subscription data are available on the further device, and
carrying out a management action on the partially and/or incompletely loaded subscription data;

wherein the management action comprises a check and/or a change of the data of the partially and/or incompletely loaded subscription data.

2. A method for managing according to claim 1, wherein the communication connection is set up via a communication protocol, in particular TCP/IP, NFC, Bluetooth.

3. The method for managing according to claim 1, wherein the further device is a server, in particular a subscription management server, a content server, an LPA host, a discovery server, and a further mobile device in a connection with the mobile device.

4. The method according to claim 1, wherein the further device is a wearable device.

5. The method according to claim 1, wherein the mobile device is a mobile telephone with a removable or inbuilt or integrated secure element, an M2M module, a vehicle with a telematics module and/or a tablet PC.

6. The method according to claim 1, wherein an application is adapted to carry out the steps of the method.

7. The method according to claim 6, wherein the application is executable on the mobile device and/or a secure element of the mobile device.

8. The method according to claim 1, wherein the management action comprises a deletion of the partially and/or incompletely loaded subscription data.

9. The method according to claim 1, wherein the mobile device includes a fully loaded subscription.

10. A method for managing partially and/or incompletely loaded subscription data, which are supplied for a mobile device, the method comprising:
    setting up a communication connection from the mobile device to a wearable device,
    the mobile device ascertaining whether the partially and/or incompletely loaded subscription data are available on the wearable device, and
    carrying out a management action on the partially and/or incompletely loaded subscription data of the wearable device;
    wherein the management action comprises a deletion of the partially and/or incompletely loaded subscription data on the wearable device.

11. A method for managing partially and/or incompletely loaded subscription data, which are supplied for a mobile device, characterized by setting up a communication connection from the mobile device to a further device,
    ascertaining whether the partially and/or incompletely loaded subscription data are available in a profile container on the further device, and
    carrying out a management action on the partially and/or incompletely loaded subscription data in the profile container of the further device, said management action comprising a deletion of the partially and/or incompletely loaded subscription data in the profile container of the further device.

* * * * *